H. R. CANFIELD.
MOTOR CONTROL SYSTEM.
APPLICATION FILED APR. 6, 1916.

1,308,927.

Patented July 8, 1919.

INVENTOR
Harry R. Canfield
by F. N. Barber
Att'y.

UNITED STATES PATENT OFFICE.

HARRY R. CANFIELD, OF CLEVELAND, OHIO, ASSIGNOR TO THE ELECTRIC CONTROLLER & MANUFACTURING COMPANY, OF CLEVELAND, OHIO, A CORPORATION OF OHIO.

MOTOR-CONTROL SYSTEM.

1,308,927.　　　　Specification of Letters Patent.　　Patented July 8, 1919.

Application filed April 6, 1916. Serial No. 89,264.

*To all whom it may concern:*

Be it known that I, HARRY R. CANFIELD, a citizen of the United States, residing at Cleveland, in the county of Cuyahoga and State of Ohio, have invented new and useful Improvements in Motor-Control Systems, of which the following is a specification.

This invention relates to electro-magnetically controlled systems for electric motors. One of the objects of my invention is to provide a motor control system and apparatus by which an electric motor may be automatically started and brought up to full speed under normal load conditions and which can be adjusted so that under such conditions the starting current will not rise above a predetermined maximum amount, and which may automatically or manually increase this maximum predetermined starting current to start the motor under abnormally large load conditions.

Another object of my invention is to provide an automatic control system which will under normal loads start and accelerate a motor immediately with normal starting current, and which under greater loads will accelerate the motor with greater starting current after a time interval has elapsed.

Another object of my invention is to provide a system of this kind operating on what is known as the current-limit principle, which will accelerate a motor with predetermined limits of starting current and in which the current limits may automatically or manually be changed to suit load conditions without interfering with the automatic current limit action.

Another object of my invention is to provide a motor control system comprising electro-magnetically operated resistance switches adjusted to close at predetermined values of motor current, and with means for varying the amount of motor current at which the switches close to suit varying load conditions without changing the adjustments of the switches.

Figure 1:
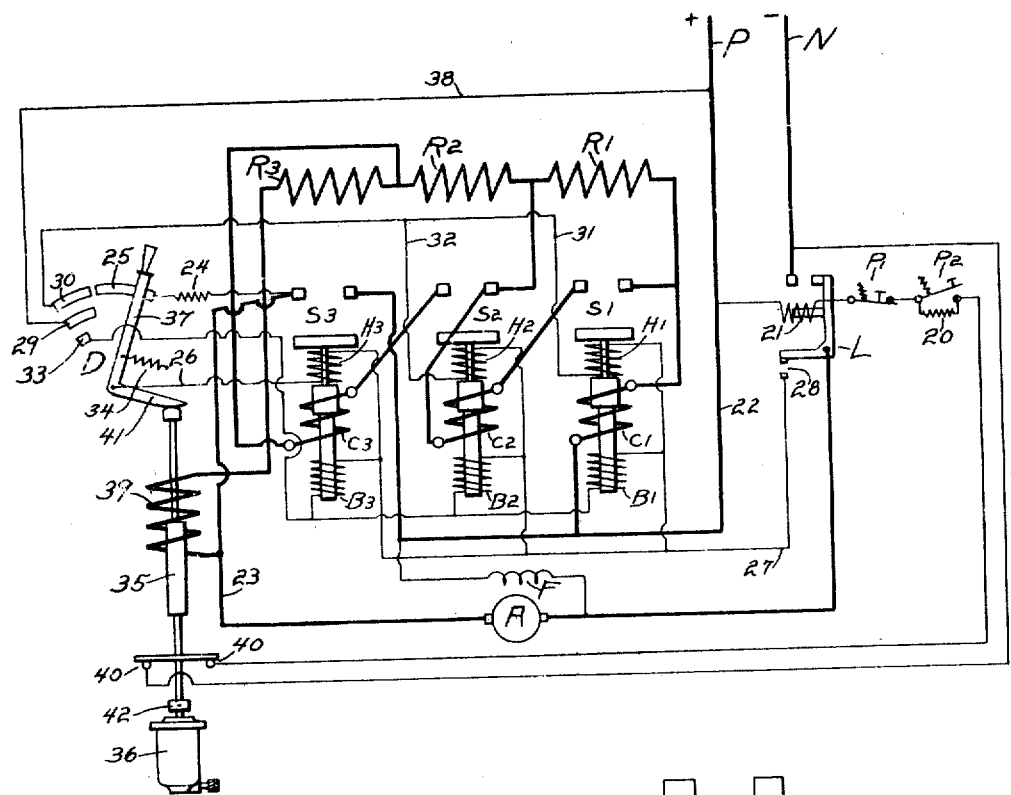
Figure 2:
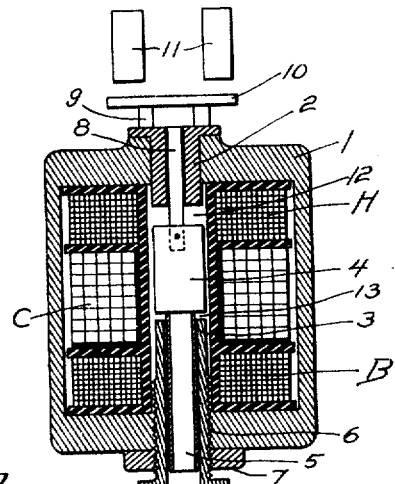

With these and other objects in view, my invention consists of the apparatus and electrical connections thereof as shown on the accompanying drawing, in which Figure 1 is a diagrammatic representation of a system embodying my invention, and Fig. 2, a longitudinal section of one of the resistance switches which I employ.

Referring to Fig. 1, A is the armature of an electric motor having the field winding F. $S^1$, $S^2$, and $S^3$ are resistance controlling switches which close successively to start the motor by cutting out the sections of the starting resistance $R^1$, $R^2$, $R^3$. L is an electro-magnetic main-circuit switch controlled by the push buttons $P^1$ and $P^2$ and the circuit-breaker contacts 40. D is a master switch by which shunt windings on the switches $S^1$, $S^2$, and $S^3$ may be energized and deënergized. The master switch D may be operated manually, or under certain conditions may operate electro-magnetically, as will be described hereinafter.

The resistance controlling switches are, in general, of the type now known as "series switches", fully described in my application, Serial Number 583,000, filed September 21, 1910, and Eastwood's Patent, No. 1,040,292, dated October 8, 1912, and illustrated with modifications in Fig. 2 of the drawing of the present application. This switch has the main frame 1, the pole piece 2, the adjustable hollow pole piece 3, and the armature 4 movable between the two pole pieces, and having the tail-piece 5 which moves vertically within the hollow pole piece 3. The pole piece 3 is threaded at 6 in the frame and may be fixed at any adjustment by the nut 7. The armature 4 is supported by the stem 8 having the head 9, which rests on the pole piece 2 and carries the contact plate 10 coöperative with the brushes 11 to close an electric circuit. A gap 12 and a gap 13 are provided between the two ends of the armature 4 and the respective pole pieces 2 and 3, the size of the gap 13 being adjustable by varying the position of the pole piece 3. The main winding is represented at C, and is to be connected in series with the motor. In the adaptation of this series switch to the purposes of my present invention, I provide it with two auxiliary shunt windings B and H.

As fully set forth in the above mentioned application and patent, this switch has the characteristic of being held open by the flux across the gap 13 when the current in the coil C is above a predetermined value, and of being pulled closed by the flux across the gap 12 when the current in the coil C is below said predetermined value. The auxiliary coils H and B of my present invention are arranged to assist the coil C to close the switch, the coil H by increasing the flux across the gap 12, thereby raising the value of the current in the coil C at which the switch will close; and the coil B by neutralizing a part of the flux across the gap 13 from the coil C, thereby also raising the value of current in the coil C at which the switch will close; so that, when the coils H and B are energized, the switches $S^1$, $S^2$, $S^3$ will close at comparatively high values of current to start the motor under an abnormal load, and when the coils H and B are not energized, the switches $S^1$, $S^2$, and $S^3$ will close at comparatively low values of current sufficient to start the motor under normal loads. The windings H and B are controlled by the master switch D. When these windings are not energized, the winding H of the last switch only, namely $S^3$, is energized with a comparatively weak current to hold it closed after it has closed.

The operation of the system will now be described: Assuming that the load on the motor is normal, the master switch D will be in the position shown. When the push-button $P^2$ is closed, the protective resistance unit 20 is short-circuited and sufficient current will then flow to energize the winding 21 of the switch L, the current flowing from the positive line P through the winding 21, the push-buttons $P^1$ and $P^2$ and the switch contacts 40 to the negative line N. The switch L will close and the push-button $P^2$ may be released, the latter then opening. The resistance 20 allows sufficient current to flow through the winding 21 to hold the switch L closed. The motor current will now flow from the positive line through the wire 22, the winding $C^1$ of the switch $S^1$, the three resistance sections $R^1$, $R^2$, and $R^3$ in series, the winding 39, the wire 23, the armature A, and the line switch L to the negative line. This current will lock the switch $C^1$ open and start the motor, and when, due to the starting of the motor, the current in the winding $C^1$ falls to the predetermined value for which this switch is adjusted to close, it will close and short-circuit the resistance section $R^1$ and connect the winding $C^2$ of the switch $S^2$ in the motor circuit. The switch $S^2$ will then be locked open and when the current falls again to the predetermined value at which this switch is adjusted to close, it will close and short-circuit the resistance section $R^2$ and connect the winding $C^3$ of the switch $S^3$ in the motor circuit. When the current again falls to the predetermined value at which the switch $S^3$ is adjusted to close, it will close and the motor current will now have a direct path from the positive line through the wire 22, the contacts of the switch $S^3$, the wire 23, the armature A, and the switch L to the negative line. This circuit short-circuits the resistance section $R^3$, the winding 39, and the windings $C^1$, $C^2$, $C^3$, but the switch $S^3$ is held closed by the winding $H^3$. The armature A is now connected directly across the lines P and N. The circuit for the winding $H^3$ is as follows: from the positive line through the wire 22, the contacts of the switch $S^3$, the resistance unit 24, the contact 25 of the master switch D, the arm of the master switch 37 and the wire 26 to the winding $H^3$, the wire 27, the auxiliary contacts 28 of the line switch L, and the line switch L to the negative line. Because of the resistance unit 24, the winding $H^3$ is weakly energized but is strong enough to hold the switch $S^3$ closed when it is closed, but it is not strong enough to close it.

Suppose now that it be desired to start the motor A when it is loaded so heavily that current in the winding $C^1$ cannot fall to the predetermined value at which the switch $S^1$ is adjusted to close. The armature A may or may not start to turn. To accelerate the motor, the master switch D may be moved to the contacts 29 and 30, through which current will pass to energize the windings $H^1$, $H^2$, and $H^3$ by the following circuit: from the positive line through the wire 38, the contact 29, the arm 37, the contact 30, the wires 31 and 32, the windings $H^1$ and $H^2$, the wire 27, the contacts 28, and the switch L to the negative line. A second circuit will also be established from the positive line through the wire 38, the contact 29, the arm 37, the wire 26, the winding $H^3$, the wire 27, the contacts 28 and the switch L to the negative line. The winding $H^1$ raises the predetermined closing current of the switch $S^1$, as has been described, and the switch $S^1$ closes. The switches $S^2$ and $S^3$ then lock out and close successively as hereinbefore described, being assisted to close at the higher predetermined current by the windings $H^2$ and $H^3$.

If, however, the load on the motor is so great that the assistance of the winding $H^1$ is insufficient to close the resistance-controlling switch $S^1$, the master switch D may be moved to the contact 33, a new circuit being made as follows: from the positive line through the wire 38, the contact 29, the master arm 37, the contact 33, and the windings $B^1$, $B^2$, and $B^3$ in parallel, the wire 27, the contacts 28 and the switch L to the negative line. The current in these windings will further raise the predetermined closing current of the resistance-controlling switches, and the motor will be accelerated as before described. With either or both of the windings H and B energized, the motor will be started and accelerated as hereinbefore described, and the motor current in each case will be maintained between definite limits. When the switch $S^3$ has closed, after acceleration under abnormal loads, the master arm 37 may be moved back to the contact 25 to deënergize the windings $H^1$, $H^2$, B¹, B², and B³, permitting the switches S¹ and S² to open and inserting the resistance 24 in the circuit of the winding H² for holding the switch S³ closed. A spring 34 may be provided to return the master arm to the contact 25 and thus restore the apparatus to normal working conditions for subsequent operation.

If desired, the master switch D may be operated automatically. For this purpose, I employ the series solenoid winding 39, having the plunger 35 which engages the lower side of the arm 41 of the master arm 37, so that the master arm 37 may be manually moved independently of the plunger 35, and so that the upward movement of the plunger 35 will move the master arm 37 in the direction of the contacts 29, 30 and 33. An adjustable dashpot 36 limits the rate of movement of the plunger. Normal motor-running current is insufficient to lift the plunger 35 against the spring 34. During starting under normal load, the peaks of starting current will give impulses to the plunger and vibrate the arm 37 on the contact 25, but the arm will not leave this contact. If, however, the load on the motor be abnormally large, the motor current will be maintained at a high value and will lift the plunger 35, and after the elapse of a predetermined time interval, depending upon the adjustment of the dashpot 36 the arm 37 will engage the contacts 29 and 30 and leave the contact 25, and cause the windings H to receive current. If the current in the windings C¹ and H¹ is insufficient to start the motor, or close the switch S¹, the plunger 35 will continue to rise until the arm 37 engages the contact 33, through which current goes to the windings B¹, B² and B³. When the motor has accelerated and the switch S³ has closed, the coil 39 is short-circuited as described, permitting the plunger 35 to fall. The spring 34 returns the arm 37 to the contact 25, causing the switches S¹ and S² to open, and the winding H³ to be energized with holding current only. If, after the excitation of the windings H and B by the upward movement of the plunger 35, the motor does not start, further upward movement of the plunger 35 will open the contacts 40 by means of the block 42 on the plunger, thereby deënergizing the winding of the line switch L and allowing it to open and disconnect the motor from the supply lines P and N.

The motor may be stopped at any time by pressing the push-button P¹, which opens the circuit of the winding 21 of the line switch L.

As stated above, the switch D may be operated either manually or electro-magnetically, or both. It will be understood that any suitable form of master switch may be used.

I do not wish to be limited to the exact form of resistance-controlling switches which I have described, because, as will be understood by those skilled in the art, other forms of resistance-controlling switches may be used. It will also be apparent that either of the windings H or B may be used without the other, that my invention may be applied to motor-reversing control system, and that many other modifications and changes may be made without departing from the spirit of my invention or sacrificing its advantages.

I claim:—

1. In a motor control system, a motor, a motor circuit, starting resistance in the circuit, switches for cutting out the resistance to start the motor, means whereby the motor starting current is maintained within predetermined limits, and means actuated by the motor current for increasing the predetermined limits above the limits of the initial motor starting current.

2. In a motor control system, a motor, a motor circuit, starting resistance in the circuit, switches for cutting out the resistance to start the motor, means whereby the motor starting current is maintained within predetermined limits, and means controlled by the motor current whereby the predetermined limits may be increased.

3. In a motor control system, a motor, a motor circuit, starting resistance in the circuit, switches for cutting out the resistance to start the motor, means whereby the starting current is maintained within predetermined limits, and means controlled by the motor whereby the predetermined limits may be increased above the limits of the initial motor starting current.

4. In a motor control system, a motor, a motor circuit, starting resistance in the circuit, switches for cutting out the resistance to start the motor, means whereby the starting current is maintained within predetermined limits, and means controlled in accordance with a function of the motor input whereby the predetermined limits may be increased above the limits of the initial motor starting current.

5. In a motor control system, a motor, a motor circuit, starting resistance in the circuit, switches for cutting out the resistance to start the motor, means whereby the starting current is maintained within predetermined limits, and automatic means controlled by the motor current for increasing the predetermined limits.

6. In a motor control system, a motor, a motor circuit, starting resistance in the circuit, a main line switch for the circuit, starting switches for cutting out the resistance to start the motor, means for maintaining the starting current within predetermined limits, and means whereby the predetermined limits may be automatically increased when a predetermined amount of time has elapsed after the closure of the line switch.

7. In a motor control system, a motor, a motor circuit, starting resistance in the circuit, a main line switch for the circuit, starting switches for cutting out the resistance to start the motor, means for maintaining the starting current within predetermined limits, and means whereby the predetermined limits may be automatically increased above the limits of the initial motor starting current when a predetermined amount of time has elapsed after the closure of the line switch.

8. In a motor control system, a motor, a motor circuit, starting resistance in the circuit, a main line switch for the circuit, starting switches for cutting out the resistance to start the motor, means for maintaining the starting current within predetermined limits, and means controlled by the motor current whereby the predetermined limits may be automatically increased when a predetermined amount of time has elapsed after the closure of the line switch.

9. In a motor control system, a motor, a motor circuit, starting resistance in the circuit, switches for cutting out the resistance to start the motor, and maintaining the current within predetermined limits, and means controlled by the motor for increasing the predetermined limits at which the switch functions.

10. In a motor control system, a motor, a motor circuit, a resistance section in the circuit, a switch for controlling the resistance, a winding for the switch, a magnetic structure acted on by current in the winding to hold the switch open when the current in the winding is above a predetermined value and to allow it to close when the current is below the predetermined value, and electro-magnetic means controlled by the motor current for increasing the predetermined value.

11. In a motor control system, a motor, a motor circuit, a main switch in the circuit, a resistance section in the circuit, a switch for controlling the resistance, a winding for the switch in the circuit, a magnetic structure acted on by current in the winding to hold the switch open when the current in the winding is above a predetermined value and to allow it to close when the current is below the predetermined value, and automatic electro-magnetic means for varying the predetermined value at the end of a time interval after the closure of the main switch.

12. In a motor control system, a motor, a motor circuit, a resistance section in the circuit, a switch for controlling the resistance, a winding for the switch, a magnetic structure acted on by current in the winding to hold the switch open when the current in the winding is above a predetermined value and to allow it to close when the current is below the predetermined value, and adjustable means whereby the predetermined value may be adjusted and fixed, and electro-magnetic means controlled by the motor current in the circuit for varying the predetermined value without disturbing the fixed adjustment.

13. In a motor control system, a motor, a motor circuit, a resistance section in the circuit, a main switch in the circuit, a switch for controlling the resistance, a winding for the switch, a magnetic structure acted on by current in the winding to hold the switch open when the current in the winding is above a predetermined value and to allow it to close when the current is below the predetermined value, and adjustable means whereby the predetermined value may be adjusted and fixed, and automatic electro-magnetic means whereby the predetermined value may be varied without disturbing the fixed adjustment at the end of a time interval after the closure of the main switch.

14. In a motor control system, a motor, a motor circuit, a motor starter for the motor, means comprised by said starter for maintaining the motor-starting current within predetermined limits, and an electromagnet in circuit with the motor for increasing the predetermined value above the limits of the initial starting current.

15. In a motor control system, a motor, a motor circuit, a motor starter for the motor, means comprised by said starter for maintaining the motor starting current within predetermined limits, and electromagnetic means controlled by the motor current for varying the predetermined limits.

16. In a motor control system, a motor, a motor circuit, means for starting the motor and maintaining the starting current at a predetermined average value, and an electromagnet in circuit with the motor for increasing the predetermined value above the limits of the initial starting current.

17. In a motor control system, a motor, a motor circuit, a line switch in the circuit, means for starting the motor and for maintaining the motor-starting current at a predetermined average value, and automatic means for changing the predetermined average value to any one of a plurality thereof upon the elapse of a predetermined time after the closure of the line switch.

18. In a motor control system, a motor, a motor circuit, starting resistance in the circuit, a main line switch for the circuit, starting switches for cutting out the resistances to start the motor, a winding for each switch, a magnetic circuit acted on by the current in the winding to hold the switch open when the current in the winding is above a predetermined value, and to allow it to close when the current is below the predetermined value, and a shunt winding for each switch adapted when energized to change the predetermined value, and means adapted to be controlled by the motor current for energizing the shunt windings.

19. In a motor control system, a motor, a motor circuit, starting resistance in the circuit, a main line switch for the circuit, starting switches for cutting out the resistances to start the motor, a winding for each switch, a magnetic circuit acted on by the current in the winding to hold the switch open when the current in the winding is above a predetermined value, and to allow it to close when the current is below the predetermined value, and a shunt winding for each switch adapted when energized to change the predetermined value, and automatic means for energizing the shunt coils at the end of a predetermined time interval after the closing of the main line switch.

Signed at Cleveland, Ohio, this 3rd day of April, 1916.

HARRY R. CANFIELD.

Copies of this patent may be obtained for five cents each, by addressing the "Commissioner of Patents. Washington, D. C."